W. R. PEARSON.
DRAFTING INSTRUMENT.
APPLICATION FILED NOV. 3, 1913.
1,191,990.
Patented July 25, 1916.
2 SHEETS—SHEET 1.
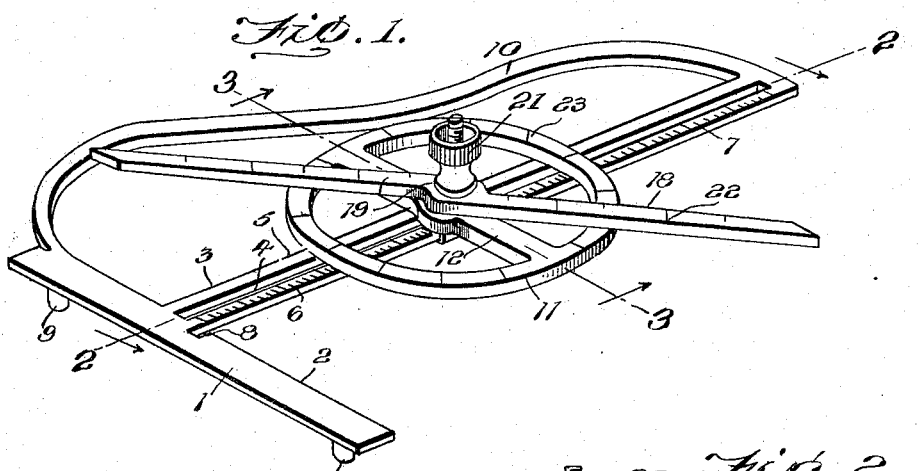
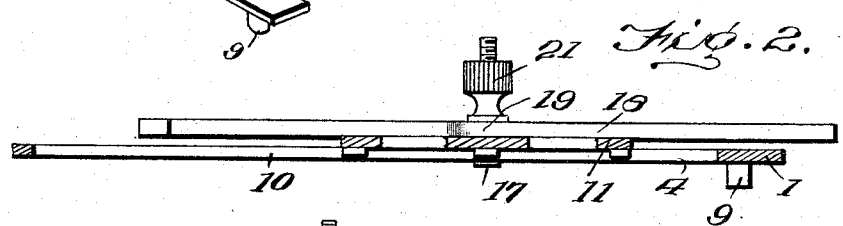
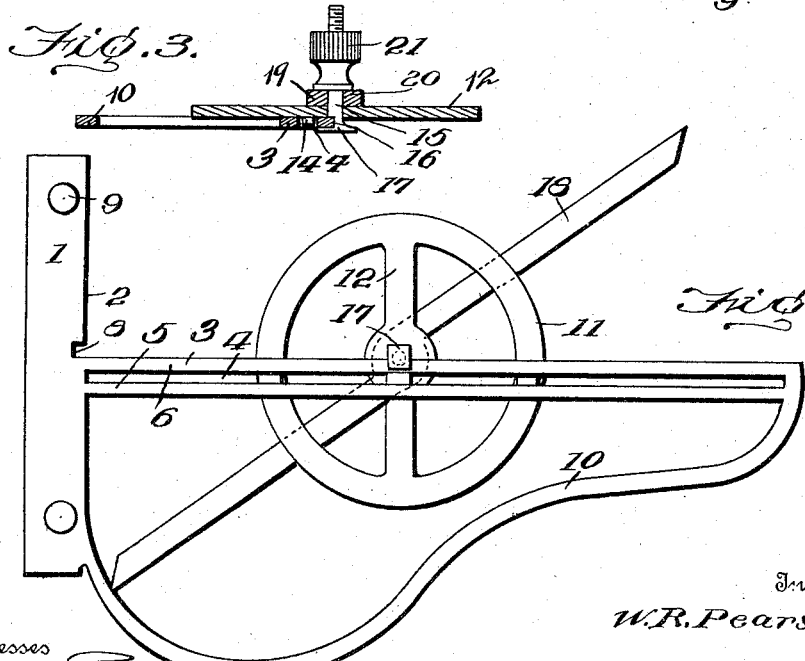
Inventor
W. R. Pearson.
Witnesses
By
Attorneys.

W. R. PEARSON.
DRAFTING INSTRUMENT.
APPLICATION FILED NOV. 3, 1913.
1,191,990.
Patented July 25, 1916.
2 SHEETS—SHEET 2.
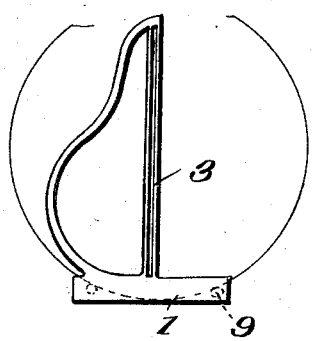
Fig. 5.
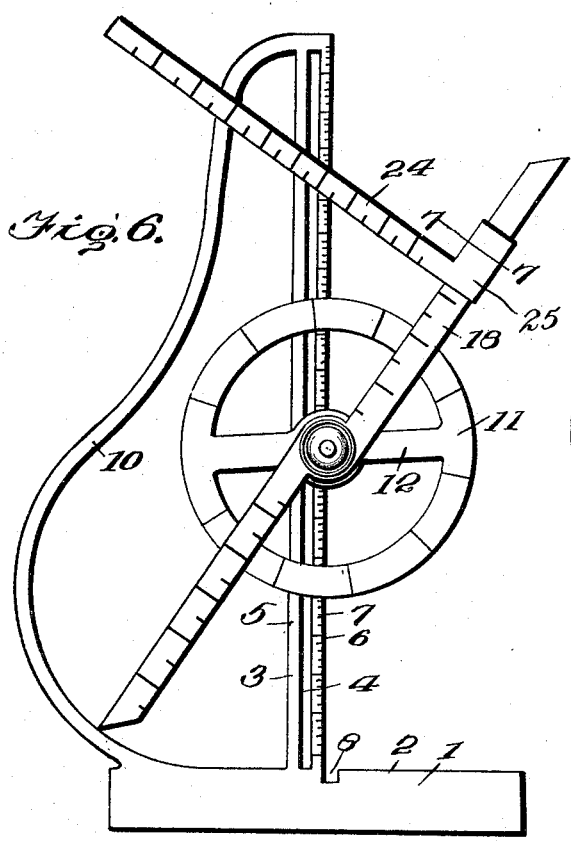
Fig. 6.
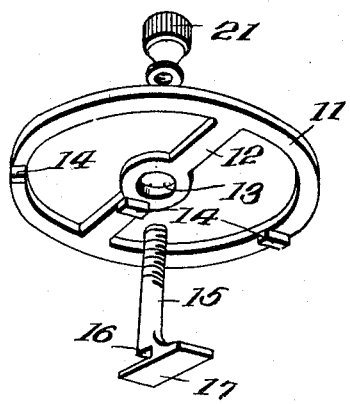
Fig. 7.
Fig. 8.
Inventor
W. R. Pearson.

UNITED STATES PATENT OFFICE.

WILLIAM REW PEARSON, OF SHERIDAN, OREGON.

DRAFTING INSTRUMENT.

1,191,990.        Specification of Letters Patent.      Patented July 25, 1916.

Application filed November 3, 1913. Serial No. 798,980.

*To all whom it may concern:*

Be it known that I, WILLIAM R. PEARSON, citizen of the United States, residing at Sheridan, in the county of Yamhill and State of Oregon, have invented certain new and useful Improvements in Drafting Instruments, of which the following is a specification.

This invention relates to drafting instruments, and more particularly to an instrument which may be employed in various ways and for various purposes after simple adjustments have been made.

It is one aim of the invention to provide an instrument which may be employed in determining the center of any circular, cylindrical, or other curvilinear figure or object.

Another aim of the invention is to provide an instrument which may not only be employed for the purpose above stated, but may also be used as a T-square and as a protractor.

For a full understanding of the invention reference is to be had to the following description and accompanying drawing, in which:—

Figure 1 is a perspective view of the instrument embodying the present invention. Fig. 2 is a vertical longitudinal sectional view on the line 2—2 of Fig. 1. Fig. 3 is a vertical section on the line 3—3 of Fig. 1. Fig. 4 is a bottom plan view of the instrument. Fig. 5 is a diagrammatic view illustrating the manner in which the instrument is to be employed in determining the center of a circle. Fig. 6 is a plan view of the instrument illustrating an attachment therefor. Fig. 7 is a sectional view on the line 7—7 of Fig. 6. Fig. 8 is a group perspective view illustrating certain of the parts about to be assembled.

Corresponding and like parts are referred to in the following description and indicated in all the views of the accompanying drawing by the same reference characters.

In the drawings, the body of the instrument is illustrated as flat sided and of frame-like structure, it including a head 1 having a straight edge 2 from which projects an arm 3 occupying the same plane as the head 1 and formed with a longitudinally extending slot 4. The arm 3 extends at right angles from the edge 2 of the head 1 and has straight edges 5 and 6 which permit of the body being employed as a T-square, or as a ruler, the upper surface of the arm 3 being preferably provided with scale marks 7 denoting inches or fractions of inches, or the units of some other linear scale.

For a purpose to be presently explained, the head 1 is formed in its edge 2 with a notch 8, one wall of which is in alinement with the edge 6 of the arm 3. Studs 9 project from the under side of the head 1 and these studs are located in a line parallel to the edge 2 of the said head and are equi-distantly spaced from the edge 6 of the arm 3 so that a line drawn at this edge will be exactly midway between the studs 9. To reinforce the arm 3 and also to prevent tilting of the body when used as a T-square, a bracing arm 10 is formed integral with the head 1 and the end of the arm 3 and is located opposite the edge 5 of the said arm and is preferably curved substantially as shown in the drawings so that the instrument may also be employed in drawing curved lines, if desired.

In order to adapt the instrument for use as a protractor, an attachment is provided which includes an annular head 11 having a cross-piece 12 which is formed with an opening 13. The annular head and cross-piece are formed upon their under sides with lugs 14 which are located in a line at right angles to the cross piece 12 and which slidably fit within the slot 4 in a manner clearly shown in Figs. 2, 3 and 4 of the drawings, when the attachment is in place upon the body of the instrument. Fitted through the opening 13 is the threaded shank 15 of a clamping bolt, the end of which is notched as at 16 and formed with a head 17 which projects a short distance laterally beyond the shank 15. By referring to Fig. 3 of the drawing it will be observed that after the bolt has been so applied to the arm 3 that the edge portion 6 of the arm may be received in the notch 16 and the head 17 will project beneath the said portion of the arm, the annular head 11 may be disposed upon the bolt with the lugs 14 engaging in the slot 4.

The arms of the protractor are indicated by the numeral 18 and are connected by an intermediate portion 19, the arms being relatively offset so that their non-corresponding edges will be substantially co-incident and the portion 19 being formed with an opening 20 receiving the shank of the clamping bolt 15. After the arm of the protractor has been arranged upon the bolt and in position resting upon the upper side of the head 11, a clamping nut 21 is threaded onto the clamping bolt and serves to bind the head 17 against the under side of the arms 3 and thereby hold the attachment as a whole at adjustment upon the said arm. It will be apparent that the arms of the protractor may be angularly adjusted about the bolt as a center and may be held at adjustment by tightening the clamping nut. It is preferable that the arms 18 be provided with scale marks 22 denoting inches and fractions of inches and the annular head 11 is provided with an annular series of scale marks 23 indicating various angles. By referring to Figs. 4 and 6 of the drawing it will be apparent that the non-corresponding but co-extensive edges of the arms 18 extend in a line transecting the axis of the clamping bolt 15 and that the opening 13 is located axially of the said head so that the said edges of the arms may indicate angles at opposite sides of a vertical line or above and below a horizontal line.

From the foregoing description of the invention and from an inspection of Fig. 5 of the drawings it will be seen that when the instrument is to be used for the purpose of finding the center of a circle, such for example as the end of a shaft to be trued or the end of a cylindrical object, the attachment is removed and the body of the instrument is disposed against the object with the studs 9 resting against the circumference of the perimeter thereof and a line is then drawn along the edge 6 of the arm 3. The instrument is then shifted so that the studs 9 will engage against the object at other points and another line is drawn. This may be repeated a number of times until the point if intersection of all of the lines determines definitely the center of the circle. The manner of using the instrument as a T-square or as a curve will be readily understood and also the manner of using the same as a protractor.

In the form of the invention shown in Figs. 6 and 7 of the drawings the arms of the protractor are provided with an attachment in the nature of an arm 24 having a head 25 provided with flanges 26 which embrace the edges of that one of the arms 18 to which the head is applied, it being understood that the head is slid upon the said arm 18. It will be apparent that the arm 24 extends at right angles from the marking edge of the arm 18 to which it is applied.

Having thus described the invention what is claimed as new is:—

1. In an instrument of the class described, a head, an arm extending from the head and having a straight edge, a protractor head longitudinally adjustably mounted upon the said arm, an angle indicating arm angularly adjustable upon the protractor head, and an arm slidably mounted upon the angle indicating arm and extending laterally therefrom.

2. In a device of the class described, a head, an arm extending from the head and having a straight edge, a protractor head disposed upon the arm, the arm being formed with a longitudinally extending slot and the protractor head being provided with means slidably engaging in the slot, a clamp having a head coöperating with the straight edge of the arm and provided with a threaded shank fitting axially through the protractor head, an arm supported for angular adjustment by the said shank, and a set nut threaded upon the shank and bearing against the arm.

3. In a device of the class described, a head, an arm extending from the head and having a straight edge, a protractor head disposed upon the arm, the arm being formed with a longitudinally extending slot and the protractor head being provided with means slidably engaging in the slot, a clamp having a head coöperating with the straight edge of the arm and provided with a threaded shank fitting axially through the protractor head, an arm supported for angular adjustment by the said shank, and a set nut threaded upon the shank and bearing against the arm, the said set nut serving both to hold the clamp head in clamping engagement with the straight edge of the said arm and to hold the protractor arm at angular adjustment.

4. In an instrument of the class described, a head, an arm extending from the head and having a straight edge, the arm being formed with a longitudinally extending slot, a protractor head disposed against the arm and provided with means slidably engageable in the slot in the said arm, a clamping member having a shank fitted axially through the head and having its axis perpendicular to the straight edge of the arm, the said member including a head engaging the straight edge of the arm, and a set nut threaded upon the shank and clamping the protractor head to the said arm.

5. In an instrument of the class described, an arm having a straight edge, a protractor head disposed against the arm, coöperating means upon the protractor head and arm for holding the said head against turning movement thereon, a clamp removably securing the head to the arm, and a protractor arm angularly adjustably mounted upon the said head.

6. In an instrument of the class described, a head, an arm projecting from the head and having a straight edge, a protractor head mounted upon the arm, a protractor arm mounted between its ends axially of the head for angular adjustment with respect thereto, and means for holding the arm at adjustment, the portions of the arm at the opposite sides of its axis being relatively offset, whereby each of said portions will have an edge extending radially with respect to the said axis of the arm.

7. In a device of the class described, a head, an arm extending from the head and having a straight edge, a protractor head slidably mounted upon the said arm and held against rotation with respect thereto, an angle indicating member supported for angular adjustment upon the said protractor head and having arms extending radially from its center, and means for holding the protractor head at adjustment upon the first-mentioned arm and for holding the angle indicating member at angular adjustment with relation to the protractor head.

8. In a device of the class described, a head, an arm extending from the head and provided with a straight edge and with a slot extending parallel to the said straight edge, a protractor head disposed upon the said arm and provided with means projecting into and slidably fitting the slot in the arm whereby to prevent rotation of the protractor head with relation to the arm, the protractor head having an annular scale bearing portion, an angle indicating arm rotatably disposed upon the protractor head, a bolt having a shank fitted through the said angle indicating arm and through the said protractor head and provided with a recess receiving the straight edge portion of the first mentioned arm whereby the axis of the protractor head will be in registration with the said straight edge of the first mentioned arm, and a nut threaded upon the said bolt and bearing against the angle indicating arm and adapted to secure the same at adjustment with relation to the protractor head.

In testimony whereof I affix my signature in presence of two witnesses.

WILLIAM REW PEARSON. [L. S.]

Witnesses:
FRED C. HYDE,
LYNN ROORK.

Copies of this patent may be obtained for five cents each, by addressing the "Commissioner of Patents, Washington, D. C."